(12) United States Patent
Gehres

(10) Patent No.: US 6,318,768 B1
(45) Date of Patent: Nov. 20, 2001

(54) TUBING COUPLER WITH PRIMARY AND SECONDARY SEALING

(75) Inventor: Michelle R. Gehres, Convoy, OH (US)

(73) Assignee: International Truck & Engine Corp, Warrenville, IL (US)

(*) Notice: Subject to any disclaimer, the term of this patent is extended or adjusted under 35 U.S.C. 154(b) by 0 days.

(21) Appl. No.: 09/562,067

(22) Filed: May 1, 2000

(51) Int. Cl.[7] ........................................ F16L 23/16
(52) U.S. Cl. .................... 285/368; 285/379; 277/609; 277/616
(58) Field of Search ............................. 285/379, 363, 285/368; 277/609, 616

(56) References Cited

U.S. PATENT DOCUMENTS

| | | | |
|---|---|---|---|
| 3,727,955 | * | 4/1973 | Carter ................................. 285/368 |
| 4,313,828 | | 2/1982 | Brownlee . |
| 5,110,160 | | 5/1992 | Brozovic . |
| 5,869,765 | | 2/1999 | Scott . |
| 5,934,712 | | 8/1999 | Friedrich . |
| 6,095,777 | * | 8/2000 | Nishihata et al. ............... 285/368 X |
| 6,106,030 | * | 8/2000 | Nader et al. ....................... 285/368 |
| 6,193,283 | * | 2/2001 | Pickett, Jr. et al. ............. 285/368 X |
| 6,217,084 | * | 4/2001 | Larsson et al. .................. 285/368 X |

* cited by examiner

Primary Examiner—Lynne H. Browne
Assistant Examiner—John R. Cottingham
(74) Attorney, Agent, or Firm—Jeffrey Calfa; Dennis Kelly Sullivan; Neil Powell Gilberto Hernandez

(57) ABSTRACT

A tubing coupler for mechanically and fluidly connecting two pieces of tubing. The tubing coupler has a first body portion with a pilot and a second body portion with a cavity in which the pilot is disposed when the tubing coupler is assembled. A fluid passageway through the first body portion and the pilot of the first body portion is in fluid communication with a fluid passageway through the second body portion and the cavity of the second body portion. Thus fluid flow is allowed through the coupler. A primary sealing device circumscribes the pilot of the first body portion and seals the space between the pilot of the first body portion and the cavity of the second body portion. A plate is disposed between the first body portion and the second body portion and defines an opening through itself through which the pilot of the first body portion protrudes. A secondary sealing device is disposed inside the periphery of the opening in the plate and surrounds a portion of the pilot. The secondary sealing device is elastically compressed between the first body portion and second body portion and acts as a back up for the primary seal.

18 Claims, 4 Drawing Sheets

TUBING COUPLER WITH PRIMARY AND SECONDARY SEALING

BACKGROUND OF THE INVENTION

This invention relates to a tubing coupler that has primary and secondary sealing devices. The coupler is designed such that if the primary sealing device fails the secondary sealing device will prevent the travel of fluid between the interior of the system and the outside atmosphere. The coupler is further designed such that, if necessary, it can be assembled without the secondary sealing device and function properly, provided the primary sealing device does not fail. The coupler can also be disassembled and subsequently reassembled with the original primary and secondary sealing devices.

RELATED ART

Tubing couplers similar to the present invention are known in the art. These tubing couplers have a first body portion for attachment to the end of a first tube and a separate, second body portion for attachment to the end of a second tube. The first body portion defines a first passageway through itself and the second body portion defines a second passageway through itself. Each respective tube is affixed to each respective body portion such that the interior of the tube is in fluid communication with the respective passageway through the respective body portion.

When the tubing coupler of the prior art is in use the first and second body portions are assembled together as a unit, but can be disassembled to allow service of the tubing, the coupler, or the system containing the tubing and the coupler. A surface other than one adjacent the point of attachment of the first tube, defines a first mating face on the first body. A surface other than one adjacent the point of attachment of the second tube, defines a second mating face on the second body. When the coupler is assembled the first mating face abuts the second mating face and means are provided for urging the two faces together. A pilot projects from the first mating face of the first body portion. The first passageway through the first body portion extends through the pilot and terminates at an opening in the end of the pilot. The first tube is attached to the first body portion adjacent the end of the first passageway which is opposite the opening in the end of the pilot. The end of the second passageway through the second body portion, which is opposite the second tube, terminates at an opening in the second mating face of the second body portion. The end of the second passageway adjacent the opening in the second mating face of the second body portion of the coupler, defines a cavity similar in shape and slightly larger than, the pilot which projects from the first mating face of the first body portion. When the coupler is assembled, the pilot of the first body portion is positioned within the cavity defined by the end of the second passageway and a small space is defined concentrically between the pilot and the cavity. The first passageway of the first body portion is thus in fluid communication with the second passageway of the second body portion. The first and second passageways are also in fluid communication with the first and second tubes respectively.

Similar to the present invention the known tubing couplers have primary and secondary sealing devices. A primary sealing device circumscribes the pilot and is disposed in the space between the pilot of the first body portion and the cavity defined by the end of the second passageway of the second body portion. This primary sealing device, thus, prevents fluid from traveling between the first or second passageways of the coupler and the outside atmosphere. A secondary sealing device is interposed between the first and second mating faces and surrounds both the pilot of the first body portion and the opening of the second passageway in the second mating face of the second body portion. This secondary sealing device prevents fluid from traveling between the first or second passageways of the coupler and the outside atmosphere through spaces, which may be present, between the first and second mating faces. The secondary sealing device is included in the coupler as a backup for the primary sealing device and is only relied upon to seal the coupler in the event that the primary seal fails.

While the known tubing couplers have many advantages, there are some aspects of their design which make them less than ideal. Many of the known tubing couplers have metallic secondary sealing devices which require elaborate machining of one or both mating faces of the coupler. In addition, these metallic sealing devices are often designed to be plastically deformed upon assembly of the coupler and must therefore be replaced with a new sealing device any time the coupler is disassembled and subsequently reassembled. In other designs of known couplers, the secondary sealing device is positioned within (a) recess(es) in one or both of the mating faces of the coupler. This design also requires costly machine work to be performed on the mating face(s) of the coupler. This design further requires the mating faces of the coupler to be larger than would otherwise be necessary. The increased size of the mating faces is necessary to allow room for the recess, and sufficient material surrounding the recess to contain the secondary sealing device. Finally, this design requires that the depth of the recess(es) in the mating faces be held within a very small tolerance range. If the recess(es) in the mating face(s) are too deep the secondary sealing device will not properly contact both of the body portions of the coupler and will not seal. If the recess(es) in the mating face(s) of the coupler are too shallow the secondary sealing device can be damaged by being compressed too far or can prevent the mating faces of the coupler from properly abutting. Another drawback of most designs of the known tubing couplers is that they can not be assembled without the secondary sealing device and still function properly.

SUMMARY OF INVENTION

As a result, there are a number of objects of the present invention. One object of the present invention is to provide a tubing coupler, which does not require elaborate machine work to be performed on either of the mating faces of the body portions of the coupler. Another object of the present invention is to provide a tubing coupler with primary and secondary sealing devices that can be reused upon disassembly and subsequent assembly of the tubing coupler. A final object of the invention is to provide a tubing coupler which can be assembled without a secondary sealing device, in the event that a secondary sealing device is temporarily unavailable, and still function properly provided that the primary sealing device does not fail.

The tubing coupler of the present invention is comprised of a first body portion, a separate second body portion, a plate and one or more clamping devices to maintain the parts of the tubing coupler in an assembled state. The first body portion of the tubing coupler has a first mating face with a pilot projecting from that first mating face. The first body portion defines a first passageway which begins at an opening in the end of the pilot which projects from the first mating face of the first body portion, travels through the first body portion, and terminates at an opening on an outer surface. The second body portion of the tubing coupler has a second mating face. The second body portion defines a second passageway which begins at a first opening in the second mating face of the second body portion, travels through the second body portion, and terminates at an opening on an outer surface of the second body portion. A portion of the inner surface of the second passageway adjacent to the first opening in the second mating face of the second body portion defines a cavity. The cavity is of the same general shape, and is slightly larger than the pilot which projects from the first mating face. When the tubing coupler is assembled, the pilot projecting from the first mating face of the first body portion of the tubing coupler is disposed within the cavity at the end of the second passageway adjacent the opening in the second mating face. The plate of the coupler defines a first opening through itself of sufficient size to allow the pilot to protrude through this first opening in the plate. In the coupler's assembled state the plate is sandwiched between the first body portion and the second body portion and the pilot protrudes through the first opening in the plate. A primary sealing device circumscribes the pilot and seals the space between the pilot and the cavity defined by the second passageway of the second body portion. A secondary sealing device is positioned within the first opening in the plate, and when the coupler is assembled surrounds both a portion of the pilot and the first opening in the second mating face adjacent the end of the second passageway. The secondary sealing device is compressed between the first mating face and the second mating face and fills spaces between the first mating face, the plate, and the second mating face through which fluid could otherwise travel.

It can thus be seen that the tubing coupler of the present invention satisfies all of the objects of the invention. The mating faces of the first body portion and the second body portion can be substantially planar and do not require elaborate machine work. Neither of the first or second sealing devices is deformed plastically when the tubing coupler is assembled. Therefore the sealing devices can be reused when the coupler is reassembled after having been disassembled. The springy nature of the secondary sealing device, the fact that it is slightly thicker than the plate, and its placement within the first opening in the plate ensure that the secondary sealing device will always be in proper sealing engagement between the two body portions. These design features also insure that the secondary sealing device will never prevent the proper assembly of the tubing coupler. Finally the coupler can be assembled without the secondary sealing device and the plate and still function properly.

DRAWINGS

Other objects and advantages of the invention will become more apparent upon perusal of the detailed description thereof and upon inspection of the drawings in which.

DETAILS OF INVENTION

Figure 1:
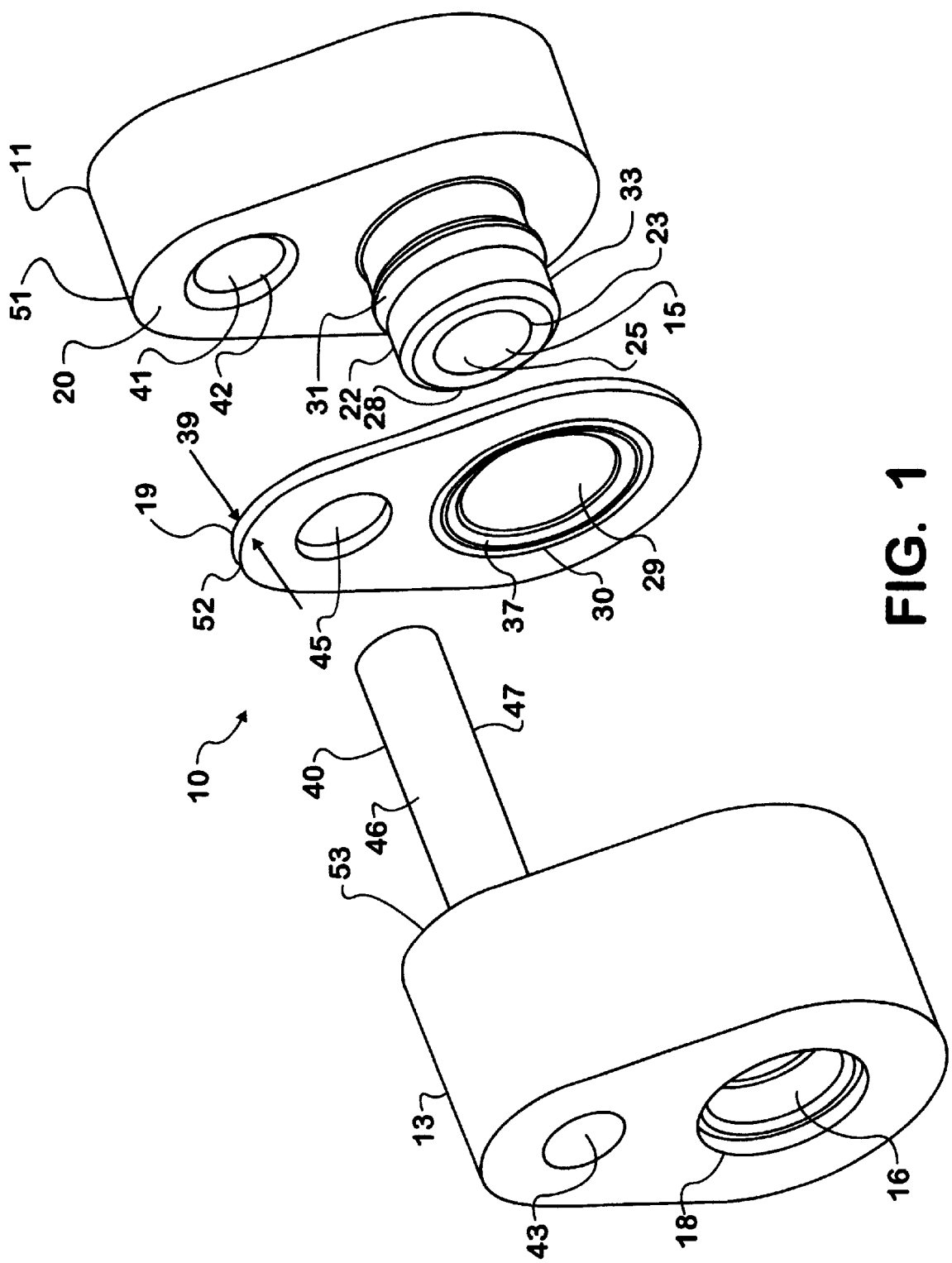
FIG. 1 is a perspective view of an exploded tubing coupler according to this invention.
Figure 2:
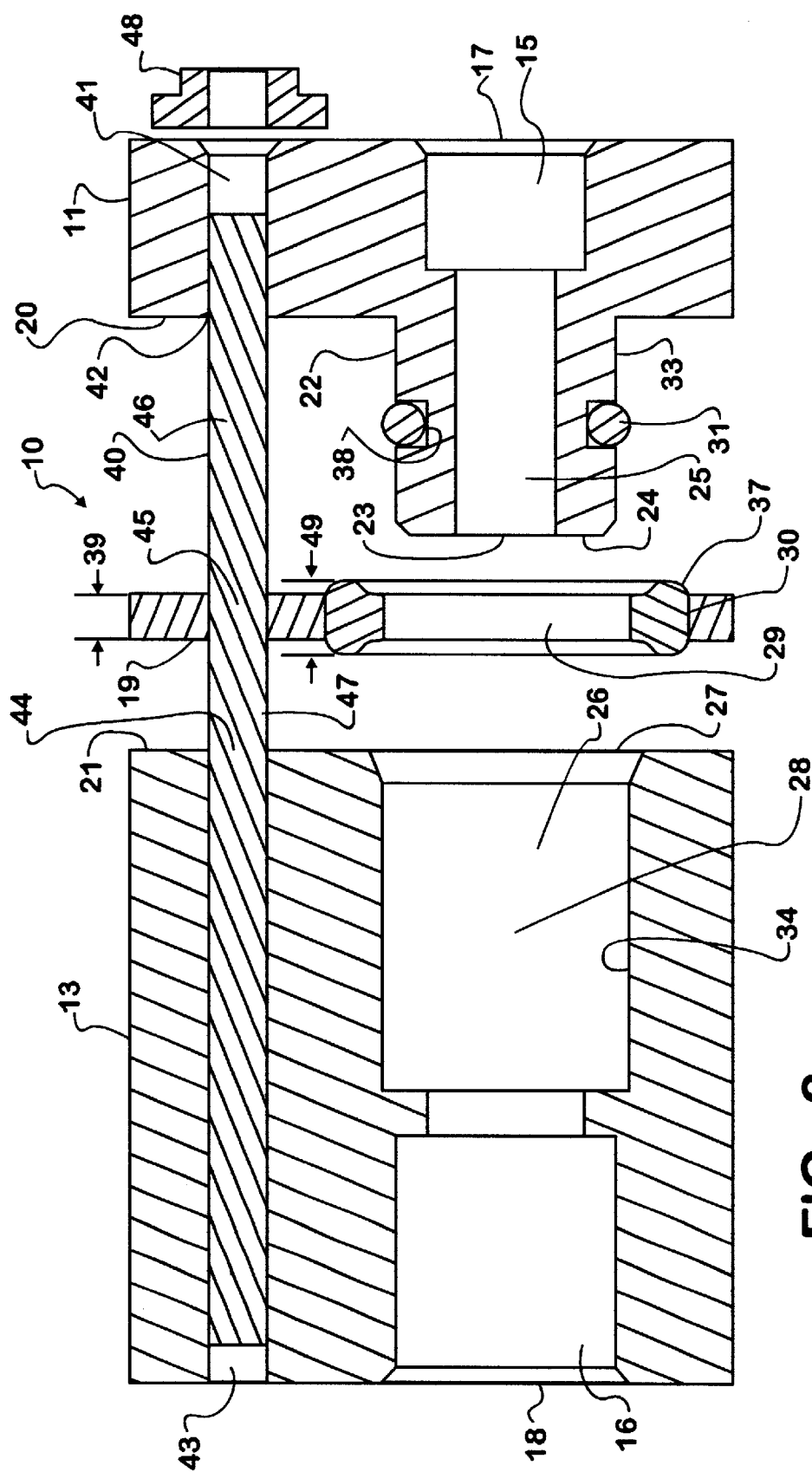
FIG. 2 is a sectional view of an exploded tubing coupler according to this invention.
Figure 3:
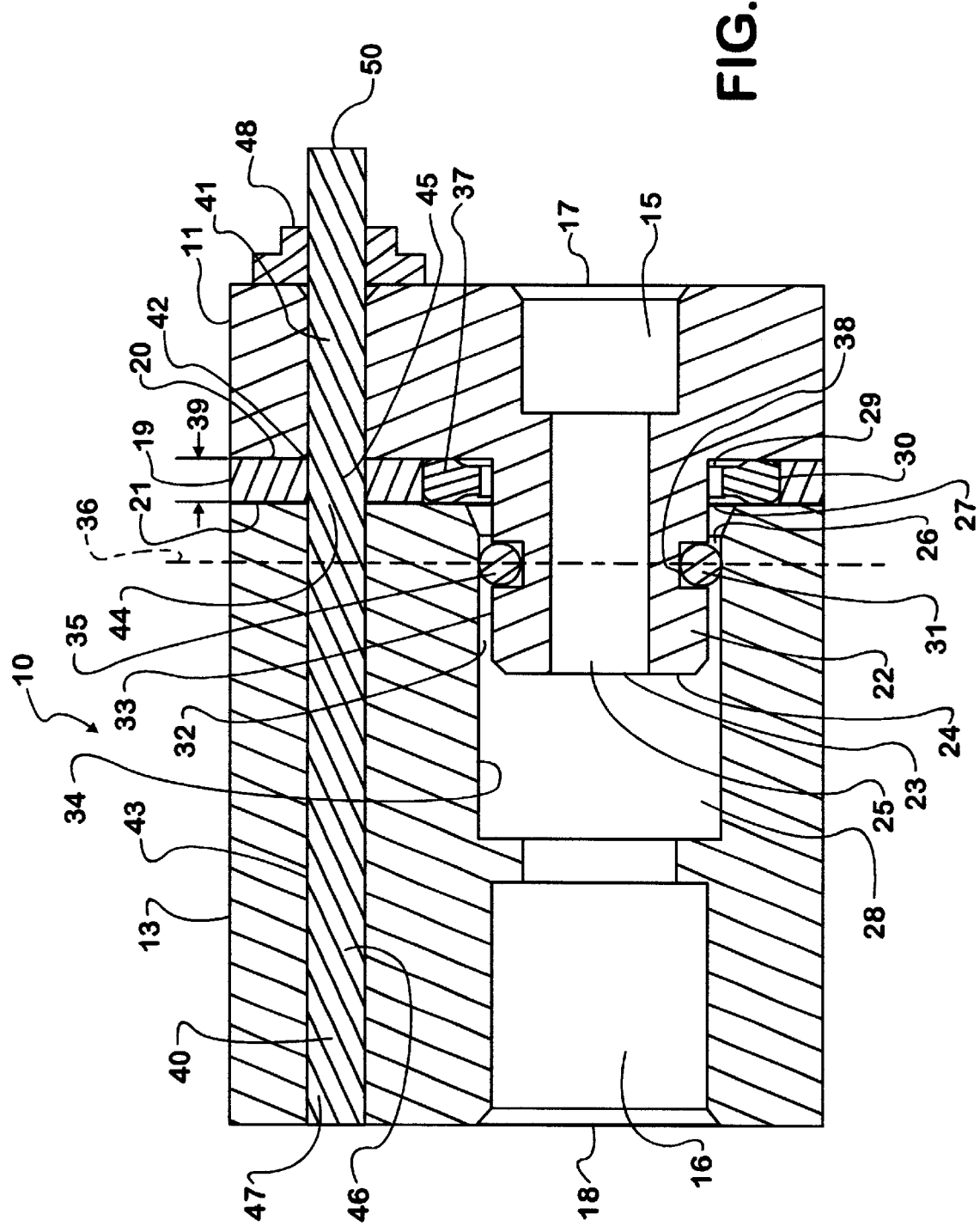
FIG. 3 is a sectional view of an assembled tubing coupler according to this invention.

There is shown in FIGS. 1–3 a tubing coupler 10 in accordance with this invention. The tubing coupler 10 has a first body portion 11 for attachment to the end of a first tube (not shown) and a separate second body portion 13 for attachment to the end of a second tube (not shown). The first body portion 11 defines a first passageway 15 through itself and the second body portion 13 defines a second passageway 16 through itself. The end of the first tube can be fixed to the first body portion 11 of the coupler 10 adjacent to an outer end 17 of the first passageway 15 and the first tube would thus be in fluid communication with the first passageway 15. The end of the second tube can be fixed to the second body portion 13 of the coupler 10 adjacent to an outer end 18 of the second passageway 16 and the second tube would thus be in fluid communication with the second passageway 16. The tubing coupler 10 is further comprised of a plate 19.

When the tubing coupler 10 is in use, the first body portion 11, the second body portion 13, and the plate 19 are assembled together as a unit but can be disassembled to allow service of the system. A surface on the first body portion 11 other than one adjacent the outer end 17 of the first passageway 15, defines a first mating face 20 on the first body portion 11. A surface on the second body portion 13 other than one adjacent the outer end 18 of the second passageway 16, defines a second mating face 21 on the second body portion 13. When the coupler 10 is assembled the plate 19 is positioned between the first mating face 20, and the second mating face 21. In the preferred embodiment, the first mating face 20 and the second mating face 21 have substantially the same profile which is continuous with no recesses or projections and the plate 19 has a thickness 39 which is substantially uniform throughout the plate 19. In the preferred embodiment an outer periphery 51 of the first body mating face 20, an outer periphery 52 of the plate 19, and an outer periphery 53 of the second mating face 21, all have substantially the same shape. A tubing coupler 10 made according to these preferred specifications can be assembled without the plate 19, and still function properly.

A pilot 22 projects from the first mating face 20 of the first body portion 11. The first passageway 15 through the first body portion 11 extends through the pilot 22 and terminates at an opening 23 in the end 24 of the pilot 22. This opening 23 in the end 24 of the pilot 22 is disposed at an inner end 25 of the first passageway 15 opposite the outer end 17. An inner end 26 of the second passageway 16, which is opposite the outer end 18, terminates at a first opening 27 in the second mating face 21 of the second body portion 13. The inner end 26 of the second passageway 16 of the second body portion 13, defines a cavity 28 similar in shape to and slightly larger than the pilot 22, which projects from the first mating face 20 of the first body portion 11. When the tubing coupler 10 is assembled, the pilot 22 is positioned within the cavity 28 defined by the inner end 26 of the second passageway 16. A small space 32 is, thus, defined concentrically between an outer surface 33 of the pilot 22 and an inner surface 34 of the cavity 28. Furthermore, the plate 19 defines a first opening 29 through itself of sufficient size that the pilot 22 can protrude through this first opening 29 in the plate 19. Thus, when the coupler 10 is correctly assembled the plate 19 is sandwiched between the first mating face 20 and the second mating face 21, and a periphery 30 of the first opening 29 in the plate 19 surrounds a portion of the pilot 22. Thus, when properly assembled and attached to the first tube 12 and the second tube 14 the tubing coupler 10 provides for fluid movement from the first tube 12 through the first passageway 15 through the second passageway 16 and into the second tube 14 and in the reverse direction.

The tubing coupler 10 further includes one or more clamping devices 40 to urge the first body portion 11 toward the second body portion 13 and thereby maintain the tubing coupler 10 in an assembled state. In the preferred embodiment, the clamping forces applied by these one or more clamping devices 40 can be released from the coupler 10 so that the first body portion 11, the second body portion 13, and the plate 19 can be separated to allow service of the system. These one or more clamping devices 40 may be of any of a large number of designs. In one preferred embodiment the first body portion 11 defines a third passageway 41 which starts at an opening 42 in the first mating face 20 and extends into the first body portion 11. The second body portion 13 may define a fourth passageway 43 which starts at a second opening 44 in the second mating face 21 and extends into the second body portion 13. The plate 19 may define a second opening 45 in itself. The fourth passageway 43 would be positioned within the second body portion 13, such that when the tubing coupler 10 is assembled, the fourth passageway 43 aligns with the third passageway 41. Furthermore, the second opening 45 in the plate 19 would be positioned within the plate 19 such that when the tubing coupler 10 is assembled the second opening 45 in the plate 19 aligns with the third passageway 41. The one or more clamping devices 40 of the tubing coupler 10 may be comprised of a member 46 which is disposed in the third passageway 41 and the fourth passageway 43, and protrudes through the second opening 45 in the plate 19 when the tubing coupler 10 is assembled. In the most preferred embodiment the one or more clamping devices 40 are comprised of a threaded stud 47 which is fixedly attached within the fourth passageway 43 and protrudes through the second opening 45 in the plate 19 and completely through and beyond the third passageway 41. A nut 48 threadedly engages an outer portion 50 of the threaded stud 47 which extends beyond the third passageway 41. When this nut 48 is tightened, it acts to urge the first body portion 11 toward the second body portion 13 and maintain the tubing coupler 10 in an assembled state.

Figure 4:
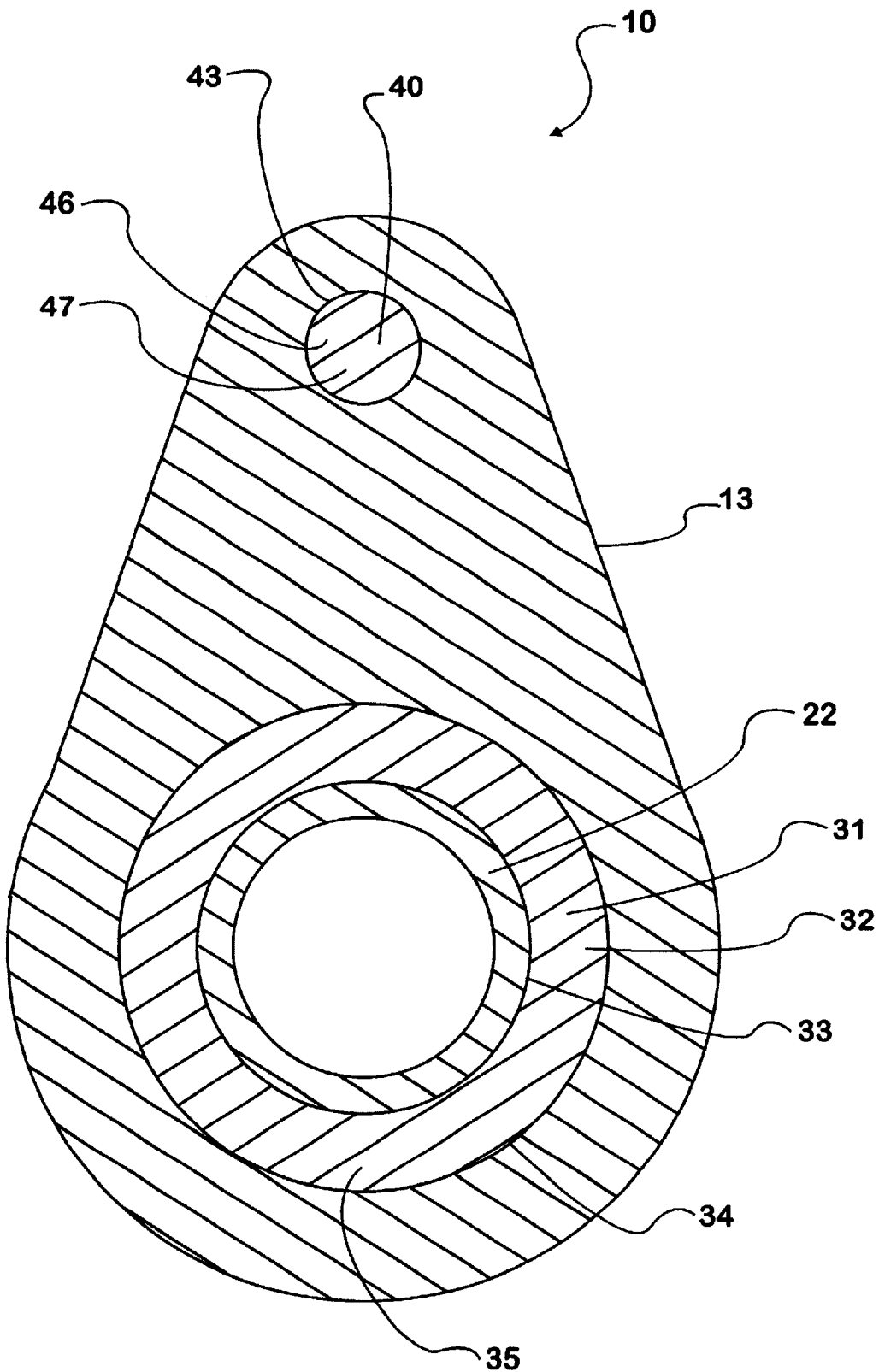
FIG. 4 is a sectional view, through section line 36 of FIG. 3, of an assembled tubing coupler.

The tubing coupler 10 of the present invention has primary sealing means. A primary sealing device 31 circumscribes a portion of the outer surface 33 of the pilot 22. This primary sealing device 31 is positioned at a distance from the first mating face 20 that is preferably greater than the thickness 39 of the plate 19. When the tubing coupler 10 is assembled, the primary sealing device 31 entirely fills a cross-section 35 (through section line 36) of the space 32 between the inner surface 34 of the cavity 28 and the outer surface 33 of the pilot 22 as is best shown in FIG. 4. The primary sealing device 31, thus, prevents fluid from traveling between the first passageway 15 or the second passageway 16 and the outside atmosphere. In the preferred embodiment, an annular groove 38 is present in the outer surface 33 of the pilot at a distance from the first mating face 20 which is greater than the thickness 39 of the plate 19. Also in the preferred embodiment the primary sealing device 31 is an O-ring sealing device and is positioned within the annular groove 38 in the outer surface 33 of the pilot 22.

The tubing coupler 10 of the present invention also has secondary sealing means. A secondary sealing device 37 is positioned inside the periphery 30 of the first opening 29 in the plate 19. The secondary sealing device may be made of any of a large number of materials. Preferably the secondary sealing device is made of a springy material such that it can be substantially elastically compressed. The secondary sealing device also has a thickness 49 that is preferably slightly greater than the thickness 39 of the plate 19. In the preferred embodiment, the secondary sealing device 37 is made of HNBR rubber which is well known in the refrigeration equipment industry and is bonded to the periphery 30 of the first opening 29 in the plate 19. When the tubing coupler 10 is assembled the secondary sealing device 37 surrounds both a portion of the outer surface 33 of the pilot 22 and the first opening 27 in the second mating face 21. When the tubing coupler 10 is assembled the secondary sealing device 37 is compressed between the first mating face 20 and the second mating face 21. Thus, the secondary sealing device 37 fills spaces between the first mating face 20, the plate 19, and the second mating face 21 through which fluid could otherwise travel. The secondary sealing device 37, therefore, prevents fluid from traveling between the first passageway 15 or the second passageway 16 and the outside atmosphere. The secondary sealing device 37 is included in the tubing coupler 10 as a backup for the primary sealing device 31 and is only relied on to seal the tubing coupler 10 in the event that the primary sealing device 31 should fail. As mentioned above, in the preferred embodiment, the first mating face 20 and the second mating face 21 have substantially the same profile which is continuous and free of recesses and projections and the plate 19 is of substantially uniform thickness 39. A tubing coupler 10 made according to these preferred specifications can be assembled without the plate 19 or the secondary sealing device 37 and still function properly provided the primary sealing device 31 does not fail.

What is claimed is:

1. A tubing coupler for fluidly and mechanically connecting a first tube and a second tube comprising:
    (a) a first body portion for engagement to the first tube and said first body portion having a first mating face;
    (b) a pilot projecting from said first mating face of said first body portion;
    (c) wherein said first body portion defines a first passageway which begins at an opening in an end of said pilot, extends through said first body portion, and terminates at an opening on an exterior surface of said first body portion other than said first mating face;
    (d) a second body portion separate from said first body portion for engagement to the second tube and said second body portion having a second mating face;
    (e) wherein said second body portion defines a second passageway which begins at a first opening in said second mating face, extends through said second body portion, and terminates at an opening on an exterior surface of said second body portion other than said second mating face;
    (f) wherein an inner end of said second passageway, which is adjacent to said first opening in said second mating face, defines a cavity which is similar to in shape and slightly larger than said pilot, such that when said tubing coupler is properly assembled said pilot is disposed within said cavity;
    (g) a plate which defines a first opening through itself of sufficient size that said pilot can protrude through said first opening in said plate;
    (h) wherein when said tubing coupler is properly assembled said plate is positioned between said first mating face and said second mating face and said pilot protrudes through said first opening in said plate;
    (i) a primary sealing device, which circumscribes a portion of said pilot, and which is positioned at a distance from said first mating face which is greater than a thickness of said plate whereby, when said tubing coupler is properly assembled said primary sealing device entirely fills a cross-section of a space defined between an outer surface of said pilot and an inner surface of said cavity defined by said inner end of said second passageway;

(j) one or more clamping devices which act on said tubing coupler to urge said first mating face of said first body portion toward said second mating face of said second body portion and maintain said tubing coupler in an assembled state;

(k) a secondary sealing device positioned inside a periphery of said first opening in said plate, whereby when said tubing coupler is properly assembled, said secondary sealing device surrounds both a portion of said pilot and said first opening in said second mating face and is elastically compressed between said first mating face and said second mating face thus filling spaces which would otherwise be present between said first mating face, said plate, and said second mating face;

(l) wherein said first body portion defines a third passageway which starts at an opening in said first mating face and extends into said first body portion;

(m) wherein said second body portion defines a fourth passageway which starts at a second opening in said second mating face, and extends into said second body portion;

(n) wherein said fourth passageway is positioned within said second body portion such that when said tubing coupler is assembled said fourth passageway aligns with said third passageway;

(o) wherein said plate defines a second opening through itself which is positioned within said plate such that when said plate is assembled in said tubing coupler said second opening in said plate aligns with said third passageway and said fourth passageway; and (p) wherein one of said one or more clamping devices of said tubing coupler is at least partially comprised of a member which is disposed in said third passageway and said fourth passageway and protrudes through said second opening in said plate when said tubing coupler is assembled with said plate.

2. The tubing coupler of claim 1, wherein:

(a) said first mating face and said second mating face have substantially the same profile which is continuous with no recesses or projections;

(b) said thickness of said plate is substantially uniform such that said tubing coupler can be assembled without said plate and said secondary sealing device and still function properly; and (c) said secondary sealing device in its free state has a thickness which is greater than said thickness of said plate.

3. The tubing coupler of claim 2, wherein:

(a) said secondary sealing device is made of a springy material and can be substantially elastically compressed, whereby said tubing coupler can be disassembled and subsequently reassembled without replacing said secondary sealing device with a new secondary sealing device.

4. The tubing coupler of claim 3, wherein:

(a) said secondary sealing device is made of HNBR rubber and is fixedly attached to said periphery of said first opening in said plate.

5. The tubing coupler of claim 4, wherein:

(a) an outer periphery of said first mating face, an outer periphery of said plate, and an outer periphery of said second mating face all have substantially the same shape.

6. The tubing coupler of claim 5, wherein:

(a) an annular groove is present in said outer surface of said pilot and is positioned at a distance from said first mating face which is greater than said thickness of said plate; and (b) said primary sealing device is an O-ring sealing device which is positioned within said annular groove.

7. The tubing coupler of claim 6, wherein:

(a) a member of said one or more clamping devices is a threaded stud which is fixedly attached within said fourth passageway;

(b) wherein when said tubing coupler is assembled, said threaded stud protrudes through said second opening in said plate and is slideably disposed within said third passageway and extends beyond said third passageway; and (c) wherein said one or more clamping devices is further comprised of a nut threadedly engaged to an outer portion of said threaded stud which protrudes past said third passageway, such that when said nut is tightened said first body portion is urged toward said second body portion.

8. The tubing coupler of claim 1, wherein:

(a) said secondary sealing device is made of a springy material and can be substantially elastically compressed, whereby said tubing coupler can be disassembled and subsequently reassembled without replacing said secondary sealing device with a new secondary sealing device.

9. The tubing coupler of claim 8, wherein:

(a) said secondary sealing device is made of HNBR rubber and is fixedly attached to said periphery of said first opening in said plate.

10. The tubing coupler of claim 9, wherein:

(a) an outer periphery of said first mating face, an outer periphery of said plate, and an outer periphery of said second mating face all have substantially the same shape.

11. The tubing coupler of claim 10, wherein:

(a) an annular groove is present in said outer surface of said pilot and is positioned at a distance from said first mating face which is greater than said thickness of said plate; and (b) said primary sealing device is an O-ring sealing device which is positioned within said annular groove.

12. The tubing coupler of claim 11, wherein:

(a) said member of said one or more clamping devices is a threaded stud which is fixedly attached within said fourth passageway;

(b) wherein when said tubing coupler is assembled, said threaded stud protrudes through said second opening in said plate and is slideably disposed within said third passageway and extends beyond said third passageway; and (c) wherein said one or more clamping devices is further comprised of a nut threadedly engaged to an outer portion of said threaded stud which protrudes past said third passageway, such that when said nut is tightened said first body portion is urged toward said second body portion.

13. A tubing coupler for fluidly and mechanically connecting a first tube and a second tube comprising:

(a) a first body portion for engagement to the first tube and said first body portion has a first mating face;

(b) a pilot projecting from said first mating face of said first body portion;

(c) wherein said first body portion defines a first passageway which begins at an opening in an end of said pilot, extends through said first body portion, and terminates at an opening on an exterior surface of said first body portion other than said first mating face;

(d) a second body portion separate from said first body portion for engagement to the second tube and said second body portion has a second mating face;

(e) wherein said second body portion defines a second passageway which begins at a first opening in said second mating face, extends through said second body portion, and terminates at an opening on an exterior surface of said second body portion other than said second mating face;

(f) wherein an inner end of said second passageway, which is adjacent to said first opening in said second mating face, defines a cavity which is similar to in shape and slightly larger than said pilot, such that when said tubing coupler is properly assembled said pilot is disposed within said cavity;

(g) a plate which defines a first opening through itself of sufficient size that said pilot can protrude through said first opening in said plate;

(h) wherein when said tubing coupler is properly assembled said plate is positioned between said first mating face and said second mating face and said pilot protrudes through said first opening in said plate;

(i) a primary sealing device, which circumscribes a portion of said pilot, and which is positioned at a distance from said first mating face which is greater than a thickness of said plate whereby, when said tubing coupler is properly assembled said primary sealing device entirely fills a cross-section of a space defined between an outer surface of said pilot and an inner surface of said cavity defined by said inner end of said second passageway;

(j) one or more clamping devices which act on said tubing coupler to urge said first mating face of said first body portion toward said second mating face of said second body portion and maintain said tubing coupler in an assembled state;

(k) a secondary sealing device which in its free state has a thickness which is greater than said thickness of said plate, positioned inside a periphery of said first opening in said plate, whereby when said tubing coupler is properly assembled, said secondary sealing device surrounds both a portion of said pilot and said first opening in said second mating face and is elastically compressed between said first mating face and said second mating face thus filling spaces which would otherwise be present between said first mating face, said plate, and said second mating face;

(l) said first mating face and said second mating face have substantially the same profile which is continuous with no recesses or projections; and (m) said thickness of said plate is substantially uniform such that said tubing coupler can be assembled without said plate and said secondary sealing device and still function properly.

14. The tubing coupler of claim 13, wherein:

(a) said secondary sealing device is made of a springy material and can be substantially elastically compressed, whereby said tubing coupler can be disassembled and subsequently reassembled without replacing said secondary sealing device with a new secondary sealing device.

15. The tubing coupler of claim 14, wherein:

(a) said secondary sealing device is made of HNBR rubber and is fixedly attached to said periphery of said first opening in said plate.

16. The tubing coupler of claim 15, wherein:

(a) an outer periphery of said first mating face, an outer periphery of said plate, and an outer periphery of said second body mating face all have substantially the same shape.

17. The tubing coupler of claim 16, wherein:

(a) an annular groove is present in said outer surface of said pilot and is positioned at a distance from said first mating face which is greater than said thickness of said plate; and (b) said primary sealing device is an O-ring sealing device which is positioned within said annular groove.

18. The tubing coupler of claim 17, wherein:

(a) a member of said one or more clamping devices is a threaded stud which is fixedly attached within said fourth passageway;

(b) wherein when said tubing coupler is assembled, said threaded stud protrudes through said second opening in said plate and is slideably disposed within said third passageway and extends beyond said third passageway; and (c) wherein said one or more clamping devices is further comprised of a nut threadedly engaged to an outer portion of said threaded stud which protrudes past said third passageway, such that when said nut is tightened said first body portion is urged toward said second body portion.

* * * * *